United States Patent [19]

Aubel

[11] Patent Number: 4,819,607
[45] Date of Patent: Apr. 11, 1989

[54] VAPOR VENT VALVE APPARATUS

[75] Inventor: John A. Aubel, Decatur, Ill.

[73] Assignee: Borg-Warner Automotive, Inc., Troy, Mich.

[21] Appl. No.: 106,207

[22] Filed: Oct. 9, 1987

[51] Int. Cl.⁴ ............................................. F02M 39/00
[52] U.S. Cl. ...................................... 123/519; 123/518
[58] Field of Search ............... 123/516, 518, 520, 521, 123/519

[56] References Cited

U.S. PATENT DOCUMENTS

| | | | |
|---|---|---|---|
| 3,662,725 | 5/1972 | Dragon | 123/518 |
| 3,672,537 | 6/1972 | Kitzner | 123/518 |
| 3,683,878 | 8/1972 | Rogers | 123/518 |
| 3,779,224 | 12/1973 | Tagawa | 123/518 |
| 3,977,379 | 8/1976 | Weissenbach | 123/518 |
| 4,000,727 | 1/1972 | Walker | 123/519 |
| 4,175,527 | 11/1979 | Sawada | 123/516 |
| 4,641,623 | 2/1987 | Hamburg | 123/518 |
| 4,651,889 | 3/1987 | Uranish, I | 123/519 |
| 4,659,346 | 4/1987 | Uranish, I | 123/519 |
| 4,703,937 | 11/1987 | Cook | 123/518 |

Primary Examiner—Carl S. Miller
Attorney, Agent, or Firm—John W. Harbst; James A. Geppert

[57] ABSTRACT

A valve apparatus including a solenoid actuated valve assembly for regulating the flow of fluid vapors from a container. The valve assembly is controlled by electrically energizable circuitry. When the circuitry is completed or closed, the valve assembly will open a passage for a predetermined time period allowing vapors to be exhausted from the container. The circuitry will be closed only when an operator actuated switch is moved by the operator to one of two positions, the inlet port to the container is opened, and after the fluid level in the tank attains a predetermined level.

26 Claims, 2 Drawing Sheets

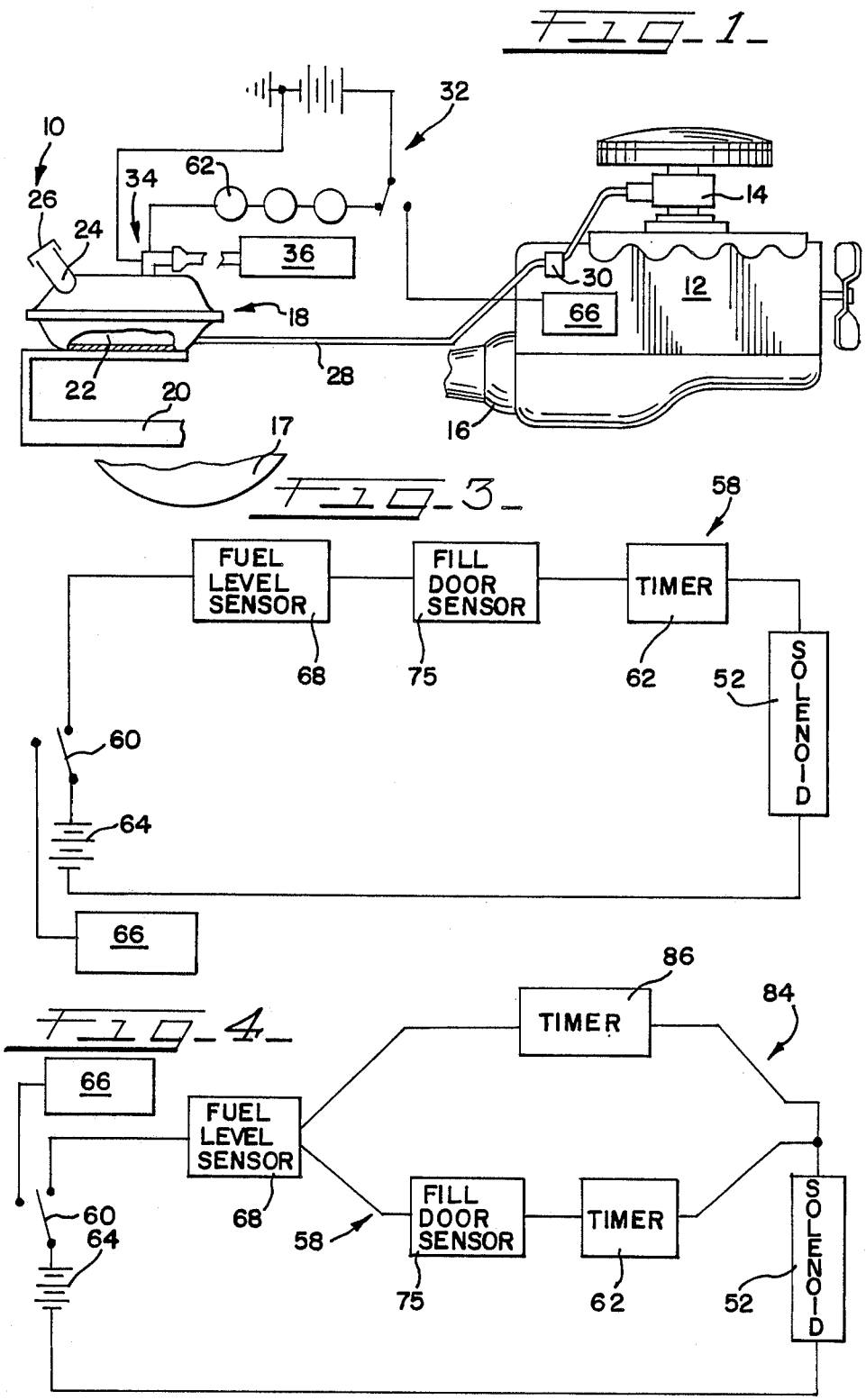

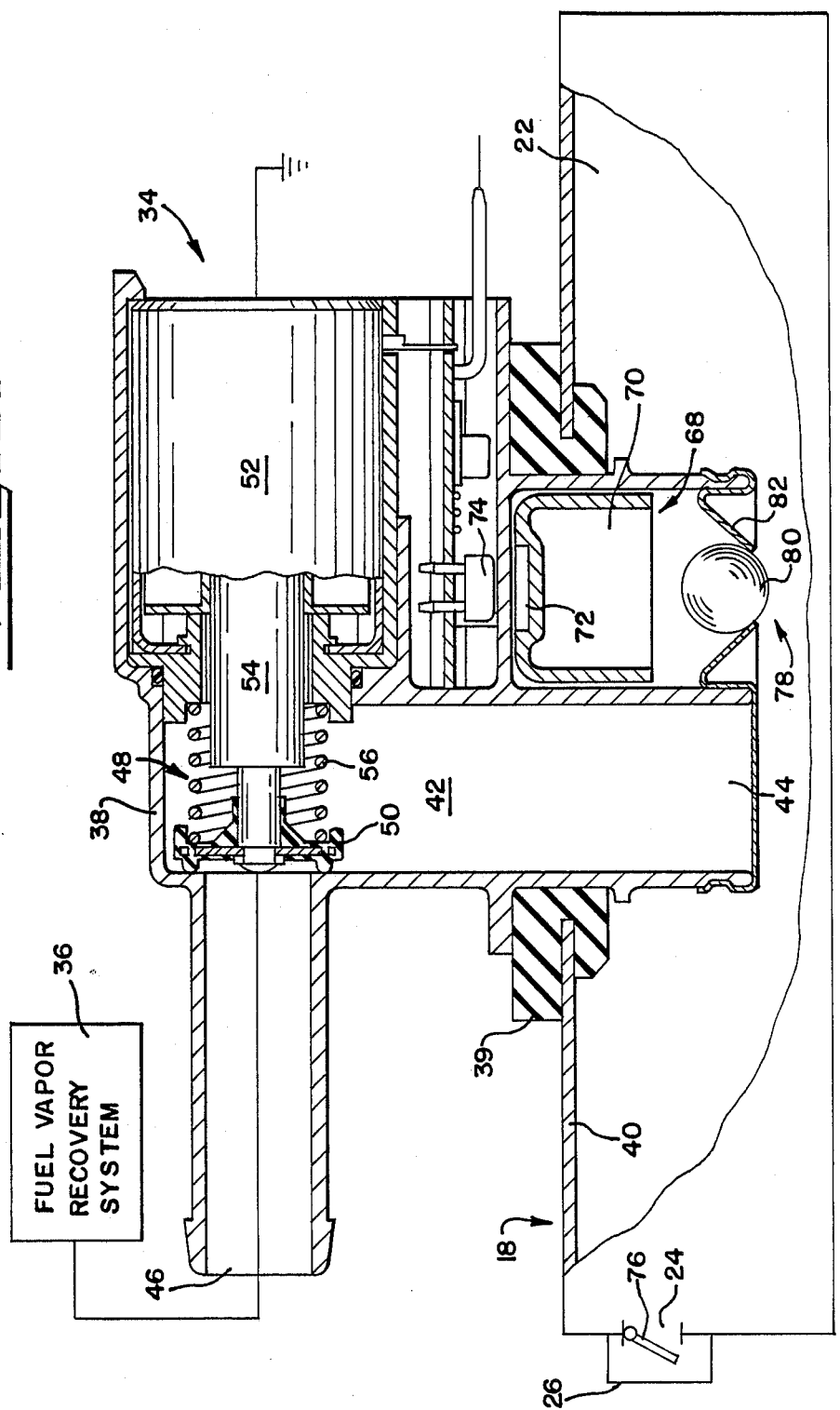

VAPOR VENT VALVE APPARATUS

FIELD OF THE INVENTION

The valve apparatus of the present invention controls pressure and escapement of fluids from an enclosed container. More specifically, the valve apparatus of this invention may be used in combination with an evaporative control vent system for a vehicle.

BACKGROUND OF THE INVENTION

Systems for permitting vapors to be exhausted from a container, including a fuel tank, are known in the art. Such systems may be satisfactory for their intended purpose under circumstances where escaping vapors are directed out of the inlet port or filler neck directly into the atmosphere during a refilling sequence or process. Evaporative loss of hydrocarbons from motor fuel tanks, however, contribute significantly to the unburned hydrocarbons emitted to the atmosphere. As such, it would be beneficial to provide an on-board method of recovering vapors from a closed container during a filling process or sequence.

SUMMARY OF THE INVENTION

In view of the above, and in accordance with the present invention, there is provided a valve apparatus including a solenoid actuated valve means which is effective to regulate the flow of fluid vapor from a container. The valve means is controlled by an electrically energizable circuit means. The circuit means responds to: first operative means including an operator influenced switch having at least two positions; second operative means for monitoring liquid levels in the container; third operative means for monitoring whether the inlet port to the container is open; and, fourth operative means including resettable timer means for monitoring how long the inlet port is or has been open. When the circuit means is completed and closed, the solenoid means is controlled to open the valve means for a predetermined period of time extending from the opening of the container's inlet port. The circuit will be completed only when the switch is moved by the operator to one of two positions and after the second operative means senses the fuel level in the tank has attained a predetermined level. An alternative embodiment of the present invention would include a second electrically energizable circuit which would open the valve for a different period of time than the first circuitry means.

In view of the above, a primary object of this invention is the provision of a valve apparatus which controls vapor escapement from a container only after certain conditions have been satisfied.

Another object of this invention is to provide a valve apparatus that is electrically controlled to permit fluid to escape from the top of a closed container only after certain conditions are satisfied.

Still a further object of this invention is the provision of an electrically controlled valve apparatus which will permit vapor to escape from a closed container within a limited space environment.

BRIEF DESCRIPTION OF THE DRAWINGS

Having in mind the above objects and other attendant advantages that would be evident from an understanding of this disclosure, the invention comprises the devices, combinations and arrangement of parts as illustrated in the presently preferred forms of the invention which are hereinafter set forth in detail to enable those skilled in the art to readily understand the function, operation, construction and advantages of same when read in conjunction with the accompanying drawings in which:

FIG. 1 is a side elevational view schematically illustrating the general arrangement of a vehicle fuel system employing the teachings of the present invention;

FIG. 2 is an enlarged cross-sectional view of a container having a valve apparatus employing the teachings of the present invention arranged in combination therewith;

FIG. 3 is an electrical schematic of the basic electrical circuit of the valve apparatus of the present invention; and FIG. 4 illustrates an alternative embodiment of the electrical circuit illustrated in FIG. 3.

DETAILED DESCRIPTION OF THE PRESENT INVENTION

Referring now to the drawings, wherein like reference numerals indicate like parts throughout the several views, the valve assembly of the present invention is illustrated in combination with a vehicle 10. Suffice it to say, the vehicle 10 includes an engine 12 with a fuel metering device 14. For purposes of discussion, the device 14 may be considered to be a carburetor. A power transmission 16, connectable to engine 12, provides power to the vehicle's ground engaging wheels 17 and conditions the vehicle for forward and reverse movements.

A container or fuel tank assembly 18 is mounted to the vehicle frame 20 in a position usually remote from the engine. The container 18 includes a fluid receiving chamber 22 in which fuel vapors generated during vehicle operation may collect. A closable inlet port or pipe 24 leads from chamber 22. Any suitable means or combination of means, i.e., fill door or air tight fuel cap 26 may be used to close the inlet port 24. The tank or container 18 has a fuel supply conduit means 28 leading therefrom to the inlet or intake of a related fuel pump assembly 30. The fuel pump assembly 30 may be of any type (many of which are well known in the art) and may be driven electrically or mechanically as by a direct mechanical connection with the engine 12.

In accordance with the present invention, an evaporative control system 32 is arranged in combination with the fuel tank or container 18 for evacuating vapors therefrom. As seen in Figure the system 32 includes a valve assembly 34 carried by the tank 18. One end of the valve assembly 34 is connected to a conventional vapor cannister 36 carried by the vehicle. As is known, cannister 36 includes active vapor absorbing materials such as activated charcoal or carbon.

Turning now to FIG. 2, the valve assembly 34 includes a housing 38 which is securely mounted by a grommet 39 in a top wall portion 40 of container 18. Housing 38 includes a passage 42 having one end 44 which opens to chamber 22 and another end 46 which opens at a location outside the container 18. In the illustrated embodiment, end 46 of housing 38 is in fluid communication with the vapor cannister 36. A solenoid actuatable valve means 48 is situated in a cooperative relationship to said passage 42 and is effective to regulate vapor flow from the container 18. The valve means 48 includes a valve member 50 and a solenoid actuator 52. Valve member 50 is arranged to regulate vapor flow through passage 42 between chamber 22 and outside of the container 18. The solenoid actuator 52 is carried by housing 38 and includes a linearly movable stem 54 the free end of which is operably connected to the valve member 50 to control disposition of same. The disposition of valve member 50 is also influenced by biasing means 56. In its presently preferred form, biasing means 56 comprises a spring which normally urges the valve member toward a closed position to effectively terminate communication of vapors from the tank.

A salient feature of the present invention is the unique manner by which the valve assembly 34 relieves pressure in the container prior to a refilling sequence or process. To effect these ends, the present invention o provides an electrically energizable circuit means 58 (FIG. 3) which operates to control the solenoid actuator 52 and thereby operation of the valve means 48. The circuitry means 58 opens the valve assembly to allow vapor escapement and pressure from the container or tank only if certain vehicular conditions are satisfied. That is, the solenoid actuatable valve means will only open if: a first operative means, defined by an operator actuated switch 60, is OFF; the liquid level in chamber 22 of container 18 has attained a predetermined level; and, inlet port 24 is open. When such conditions are met, the electrical circuitry 58 including another operative means, defined in the presently preferred embodiment by a resettable timer 62, allows or permits the solenoid actuator 52 to be energized for a predetermined time period whereby moving valve member 50 against the action of spring 56 in a manner opening the valve assembly 34. The extent or period of time the passage 42 is open is modulatable. In the vehicular example illustrated, switch means 60 may be defined by the automobile ignition switch having at least two operative positions and which is disposed between an energy source 64 and an electrical starter 66 for the engine 12.

Such that the valve assembly 34 may operate in the manner described, the present invention provides operative means 68 to monitor the liquid level in the chamber 22 of container 18 and develop a signal indicative of the liquid attaining a predeterminable level. In the illustrated embodiment of FIG. 2, operative means 68 includes a fluid level sensor including a float means 70 having a magnet 72 carried thereby and a hall effect sensor 74. When the magnet 72 (representative of liquid level in chamber 22) is displaced a predetermined distance from sensor 74, the sensor 74 develops a signal indicative of the fuel level reaching or attaining a predetermined level. Another operative means 75 is provided to monitor whether the inlet port 24 to chamber 22 is open. Such operative means may include a reed, hall effect sensor, or switch 76 arranged at the inlet port 24 to chamber 22 to detect the state of a fill door, gas cap, etc. An attitude sensor means 78 may also be provided to influence the operation of the solenoid actuator should the vehicle be rolled over. In its preferred form, the attitude sensor means 78 includes a spherical element 80 positioned approximate float 70 on a ramp 82 provided in housing 38. The spherical element or ball 80 is freely movable and responds to attitude changes of the fuel tank to move float 70 with its magnet 72 relative to the sensor 74.

FIG. 4 schematically illustrates alternative electrically energizable circuitry 84 for operating the valve assembly 34. As illustrated in FIG. 4, the second electrically energizable circuitry 84 is arranged in parallel with the described circuitry in FIG. 3. Like circuitry 58 illustrated and described in FIG. 3, the second circuitry is responsive to the state of switch means 60 and to the liquid level in chamber 22 and further includes a resettable timer 86. In this alternative embodiment, if the switch 60 is OFF and the liquid in chamber 22 of container 18 has attained a predetermined level, timer 86 associated with the circuitry 84 controls the solenoid actuator 52 to open the valve means 48. The timer associated with circuitry 84 allows the valve means 48 to be open for a different period of time than the timer 62 associated with the other circuitry 58.

With either embodiment, the solenoid actuator 52 and valve member 50 cooperate to control the vapors flowing from container 18. As will be understood, solenoid actuator 52 is operable to move an armature, in this embodiment stem 54, in response to the creation of an electromagnetic field which is created or imposed as a result of closing or completion of either circuitry 58 or 84. As discussed above, circuitry 58 will be closed or completed for a predetermined period of time only when: the operator controlled switch 60 is OFF; the liquid level in chamber 22 of container 18 has attained a predetermined level determined by the operative means discussed above; and, the inlet port 24 to chamber 22 is opened as determined by the operative means described above. Similarly, the electrical energizable circuit 84 may be closed or completed for a predetermined period of time only when: the operator controlled switch 60 is OFF; and, the liquid level in chamber 22 of container 18 has attained a predetermined level as determined by the operative means described above. The purpose of the second circuit 84 is to relieve pressure in the tank prior to the operator removing the fuel cap. Whereas, the provision of either system will avoid fuel "spit back" or objectional noise when the inlet port is initially opened during a refilling or refueling process.

Thus, there has been provided a VAPOR VENT VALVE APPARATUS which fully satisfies the aims, objectives, and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

Thus, having adequately described my invention what I claim is:

1. A valve apparatus for controlling the flow of liquid from a vehicle fuel tank having a closable fuel inlet leading from a liquid receiving tank interior, said valve apparatus comprising:

vapor vent conduit means opening into said tank interior for purging vapors from said tank;

valve means arranged in a cooperative relationship with said conduit means and effective to regulate the flow of fluid from said tank;

electrically energizable circuit means responsive to: first operative means including an operator influenced switch having at least two positions, second operative means for monitoring fuel level in said tank, third operative means for monitoring whether the inlet port is open or closed, fourth operative means including resettable timer means for monitoring when and for how long the inlet port is open; and, solenoid means for influencing the effectiveness of said valve means, wherein said circuit means is completed and said solenoid means is controlled to open said valve means for a predetermined period of time extending from the opening of said fuel inlet and after said switch means is moved by the operator to one of said two positions and when said second operative means senses the fuel level in said tank has attained a predetermined level.

2. The valve apparatus of claim 1 wherein said vapor vent conduit means is connectable to a vapor adsorbing cannister means.

3. The valve apparatus of claim 1 further including biasing means for normally urging said valve means toward a closed position to effectively terminate communication of fuel vapors from said tank.

4. The valve apparatus of claim 1 wherein the extent of time said solenoid is controlled to open said valve means is modulatable.

5. The valve apparatus of claim 1 wherein said operator influenced switch is an automobile ignition switch.

6. The valve apparatus of claim 1 wherein said second operative means includes buoyant float means for monitoring fuel level in said tank.

7. The valve apparatus of claim 1 wherein said third operative means is operably responsive to a closure member for said fuel inlet.

8. A valve apparatus for controlling the flow of vapor from a container having a closable liquid inlet, said valve apparatus comprising:
a housing having a passage one end of which opens to a liquid receiving chamber provided in said container and another end which opens to outside the container;
solenoid actuatable valve means situated in cooperative relationship to said passage and effective to regulate vapor flow between said chamber and outside of the container; and
operative means for controlling the opening of said valve means based on conditions indicating the liquid level in the tank; whether the liquid inlet is open; and whether an operator actuated switch is open.

9. The valve apparatus of claim 8, wherein said another end of said housing is connectable to a vapor adsorbing cannister.

10. The valve apparatus of claim 8 further including biasing means for normally urging said valve means toward a closed position to effectively terminate vapor flow between said chamber and outside of the container.

11. The valve apparatus of claim 8 wherein means are provided for monitoring the liquid level in the tank, said monitoring means being capable of developing a signal indicative of said liquid level.

12. The valve apparatus of claim 11 wherein said monitoring means includes a buoyant float which moves toward and away from a sensor capable of developing a signal indicative of the distance between said float and said sensor.

13. The valve apparatus of claim 8 wherein said means are provided for monitoring whether the liquid inlet is open, said monitoring means being capable of developing a signal indicative of whether the liquid inlet is open.

14. The valve apparatus of claim 8 further including means for measuring how long the inlet has been open and for changing state and delivering a signal after a predetermined time has lapsed following the opening of said liquid inlet.

15. The valve apparatus of claim 14 wherein the predetermined time length is modulatable.

16. The valve apparatus of claim 8 wherein said operator actuated switch is an ignition switch for an automobile.

17. A valve apparatus for controlling the flow of vapor from a container during a refilling process, said container having a liquid accommodating chamber and a closable port through which fluid is admitted to said chamber, said valve apparatus comprising:
a housing having a passage one end of which opens to said chamber and the other end of which opens of said container;
a solenoid controlled valve assembly for controlling vapor flow through said passage;
first sensor means for monitoring liquid level in said chamber and capable of developing a signal when the liquid attains a predetermined level;
second sensor means for monitoring whether said port is closed and capable of developing a signal indicative thereof; and
first electrically energizable circuitry including an operator controlled switch means, said circuitry being responsive to said switch means and to said sensor means signals for controlling said solenoid controlled valve assembly such that said valve assembly is opened for a predetermined period of time when said switch means is open, said first sensor means signal indicates the liquid level in said chamber has attained a predetermined level and said second sensor means signal indicates said port is open.

18. The valve apparatus of claim 17 further including second electrically energizable circuitry arranged in parallel to said first electrically energizable circuitry, said second electrically energizable circuitry being responsive to said switch means and to the signal from said first sensor means for controlling said solenoid controlled valve assembly such that said valve assembly is opened for a predetermined period of time when said switch means is open and said first sensor means signal indicates the liquid level in said chamber has attained a predetermined level.

19. The valve apparatus of claim 18 wherein said second electrically energizable circuitry opens said valve assembly for a different period of time than said first electrically energizable circuitry.

20. The valve apparatus of claim 17 wherein said other end of said housing is connectable to a vapor adsorbing cannister.

21. The valve apparatus of claim 17 further including biasing means for normally urging said valve assembly toward a closed position to effectively terminate communication of vapor flow from said chamber.

22. The valve assembly of claim 17 wherein said first sensor means includes a buoyant float for monitoring fuel level in said chamber.

23. The valve assembly of claim 22 wherein said first sensor means is further influenced by an attitude responsive means arranged to move said float.

24. The valve assembly of claim 17 wherein said container is a fuel tank on an automotible.

25. The valve assembly of claim 17 wherein said switch means is an automobile ignition switch.

26. The valve assembly of claim 17 wherein said second sensor means is operably responsive to a closure member for said fuel inlet.

* * * * *